(12) United States Patent
Owoyele et al.

(10) Patent No.: US 12,190,222 B2
(45) Date of Patent: Jan. 7, 2025

(54) ACTIVE OPTIMIZATION APPROACH FOR RAPID AND EFFICIENT DESIGN SPACE EXPLORATION USING ENSEMBLE MACHINE LEARNING

(71) Applicant: UCHICAGO ARGONNE, LLC, Chicago, IL (US)

(72) Inventors: Opeoluwa Olawale Owoyele, Aurora, IL (US); Pinaki Pal, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1091 days.

(21) Appl. No.: 16/696,920

(22) Filed: Nov. 26, 2019

(65) Prior Publication Data
US 2021/0042609 A1  Feb. 11, 2021

Related U.S. Application Data

(60) Provisional application No. 62/884,502, filed on Aug. 8, 2019.

(51) Int. Cl.
  *G06N 3/045* (2023.01)
  *G06F 7/58* (2006.01)
  *G06N 3/08* (2023.01)

(52) U.S. Cl.
  CPC .......... *G06N 3/045* (2023.01); *G06F 7/582* (2013.01); *G06N 3/08* (2013.01)

(58) Field of Classification Search
  CPC ........ G06F 7/582; G06N 3/0454; G06N 3/08; G06N 3/006; G06N 3/126; G06N 5/003; G06N 20/10; G06N 20/20
  See application file for complete search history.

(56) References Cited

U.S. PATENT DOCUMENTS

| | | | |
|---|---|---|---|
| 2007/0005313 A1* | 1/2007 | Sevastyanov | G06F 17/11 703/2 |
| 2011/0078100 A1* | 3/2011 | Goel | G06N 3/126 706/13 |

(Continued)

OTHER PUBLICATIONS

Nardi, L. et al., "Practical Design Space Exploration" (Year: 2019).*

(Continued)

*Primary Examiner* — Alexey Shmatov
*Assistant Examiner* — Devika S Maharaj
(74) *Attorney, Agent, or Firm* — Foley & Lardner LLP (57) ABSTRACT

A design optimization method based on active learning, which involves dynamic exploration and exploitation of the design space of interest using an ensemble of machine learning algorithms. In this approach, a hybrid methodology incorporating an explorative weak learner which fits high-level information about the response surface, and an exploitative strong learner (based on committee machine) that fits finer details around promising regions identified by the weak learner, is employed. For each design iteration, an aristocratic approach is used to select a set of nominees, where points that meet a threshold merit value as predicted by the weak learner are selected to be evaluated using function evaluation. In addition to these points, the global optimum as predicted by the strong learner is also evaluated to enable rapid convergence to the actual global optimum once the most promising region has been identified by the optimizer.

20 Claims, 6 Drawing Sheets

(56) References Cited

U.S. PATENT DOCUMENTS

| | | | | |
|---|---|---|---|---|
| 2016/0048771 | A1* | 2/2016 | Chen | G06N 20/00 |
| | | | | 706/12 |
| 2019/0026466 | A1* | 1/2019 | Krasser | G06N 3/08 |
| 2019/0095805 | A1* | 3/2019 | Tristan | G06N 5/045 |
| 2020/0210812 | A1* | 7/2020 | Baker | G06N 3/044 |
| 2020/0410090 | A1* | 12/2020 | Baker | G06F 21/602 |
| 2021/0042297 | A1* | 2/2021 | Urbanke | G06N 20/00 |

OTHER PUBLICATIONS

Cheng, Y. et al., "ThermalNet: A deep reinforcement learning-based combustion optimization system for coal-fired boiler" (Year: 2018).*

Zhang, C. et al., "Deep Belief Networks Ensemble with Multi-objective Optimization for Failure Diagnosis" (Year: 2015).*

Liu, H. et al., "On Learning-Based Methods for Design-Space Exploration with High-Level Synthesis" (Year: 2013).*

Sewell, M., "Ensemble Learning" (Year: 2008).*

Nardi, L. et al., "Practical Design Space Exploration", https://arxiv.org/abs/1810.05236 (Year: 2019).*

Cheng, Y. et al., "ThermalNet: A deep reinforcement learning-based combustion optimization system for coal-fired boiler", https://www.sciencedirect.com/science/article/pii/S0952197618301477 (Year: 2018).*

Sewell, M., "Ensemble Learning", http://machine-learning.martinsewell.com/ensembles/ensemble-learning.pdf (Year: 2008).*

Nardi, L. et al., "Practical Design Space Exploration", https://arxiv.org/abs/1810.05236, Jul. 2019 (Year: 2019).*

Natekin, A. et al., "Gradient boosting machines, a tutorial", https://www.frontiersin.org/articles/10.3389/fnbot.2013.00021/full (Year: 2013).*

Ceperic, V. et al., "Recurrent sparse support vector regression machines trained by active learning in the time-domain", https://www.sciencedirect.com/science/article/pii/S0957417412005015 (Year: 2012).*

Buche, D. et al., "Multiobjective Evolutionary Algorithm for the Optimization of Noisy Combustion Processes", https://ieeexplore.ieee.org/abstract/document/1176895 (Year: 2002).*

Abadi, et al., "TensorFlow: Large-Scale Machine Learning on Heterogeneous Distributed Systems," Cornell University Computer Science: Distributed, Parallel, and Cluster Computing, arXiv:1603.04467, 19 pages (2016).

Bergmeir, et al., "Memetic Algorithms with Local Search Chains in R: The Rmalschains Package," Journal of Statistical Software 75(4), pp. 1-33 (2016).

Clerc, "Beyond Standard Particle Swarm Optimisation," Innovations and Developments of Swarm Intelligence Applications, pp. 1-19 (2012).

Holmstrom, et al., "An adaptive radial basis algorithm (ARBF) for expensive black-box mixed-integer constrained global optimization," Optimization and Engineering 9(4), pp. 311-339 (2008).

Jones, "A Taxonomy of Global Optimization Methods Based on Response Surfaces," Journal of Global Optimization 21(4), pp. 345-383 (2001).

Kennedy & Eberhart, "Particle swarm optimization," Proceedings of ICNN'95—International Conference on Neural Networks, pp. 1942-1948 (1995).

Moiz, et al., "A Machine Learning-Genetic Algorithm (ML-GA) Approach for Rapid Optimization Using High-Performance Computing," SAE International Journal of Commercial Vehicles 11(5), pp. 291-306 (2018).

Muller, "MISO: mixed-integer surrogate optimization framework," Optimization and Engineering 17(1), pp. 177-203 (2016).

Pal, et al., "Numerical Investigation of a Gasoline-Like Fuel in a Heavy-Duty Compression Ignition Engine Using Global Sensitivity Analysis," SAE International Journal of Fuels and Lubricants 10(1), pp. 56-68 (2017).

Pedregosa, et al., "Scikit-learn: Machine Learning in Python," Journal of Machine Learning Research 12, pp. 2825-2830 (2011).

Pei, et al., "CFD-Guided Combustion System Optimization of a Gasoline Range Fuel in a Heavy-Duty Compression Ignition Engine Using Automatic Piston Geometry Generation and a Supercomputer," SAE International Journal of Advances & Current Practices in Mobility 1(1), pp. 166-179 (2019).

Rezaei, et al., "Performance prediction of HCCI engines with oxygenated fuels using artificial neural networks," Applied Energy 138, pp. 460-473 (2015).

Samadani, et al., "A Method for Pre-Calibration of DI Diesel Engine Emissions and Performance Using Neural Network and Multi-Objective Genetic Algorithm," Iranian Journal of Chemistry and Chemical Engineering 28(4), pp. 61-70 (2009).

Senecal, "Numerical optimization using the GEN4 micro-genetic algorithm code," University of Wisconsin-Madison: Engine Research Center, 18 pages (2000).

Validi, et al., "HCCI Intelligent Rapid Modeling by Artificial Neural Network and Genetic Algorithm," Journal of Combustion 2012, 854393, 11 pages (2012).

Van Der Laan, et al., "Super Learner," Statistical Applications in Genetics and Molecular Biology 6(1), 23 pages (2007).

Vaughan & Bohac, "An Extreme Learning Machine Approach to Predicting Near Chaotic HCCI Combustion Phasing in Real-Time," Cornell University Computer Science: Machine Learning, arXiv:1310.3567, 11 pages (2015).

Wang, et al., "An evaluation of adaptive surrogate modeling based optimization with two benchmark problems," Environmental Modelling & Software 60, pp. 167-197 (2014).

Bertram, et al., "A novel particle swarm and genetic algorithm hybrid method for diesel engine performance optimization," International Journal of Engine Research 17(7), pp. 732-747 (2016).

Brahma, et al., "A New Approach to System Level Soot Modeling," SAE Technical Paper 2005-01-1122, 16 pages (2005).

Hanson, et al., "Piston Bowl Optimization for RCCI Combustion in a Light-Duty Multi-Cylinder Engine," SAE International Journal of Engines 5(2), pp. 286-299 (2012).

He & Rutland, "Modeling of a Turbocharged DI Diesel Engine Using Artificial Neural Networks," SAE Technical Paper 2002-01-2772, 14 pages (2002).

He & Rutland, "Neural Cylinder Model and Its Transient Results," SAE Technical Paper 2003-01-3232, 17 pages (2003).

Joly, et al., "Machine Learning Enabled Adaptive Optimization of a Transonic Compressor Rotor With Precompression," Journal of Turbomachinery 141(5), 051011, 9 pages (2019).

Kavuri & Kokjohn, "Exploring the potential of machine learning in reducing the computational time/expense and improving the reliability of engine optimization studies," International Journal of Engine Research, 1468087418808949, X pages (2018).

Krishnakumar, "Micro-Genetic Algorithms For Stationary And Non-Stationary Function Optimization," SPIE Proceedings 1196: Intelligent Control and Adaptive Systems, pp. 289-296 (1990).

Probst, et al., "Optimization and Uncertainty Analysis of a Diesel Engine Operating Point Using CFD," ASME 2016 Internal Combustion Engine Division Fall Technical Conference, 13 pages (2016).

Shi & Reitz, "Optimization of a heavy-duty compression-ignition engine fueled with diesel and gasoline-like fuels," Fuel 89(11), pp. 3416-3430 (2010).

Wickman, et al., "Diesel Engine Combustion Chamber Geometry Optimization Using Genetic Algorithms and Multi-Dimensional Spray and Combustion Modeling," SAE Transactions 110(2001), Section 3: Journal of Engines, pp. 487-507 (2001).

Wu, et al., "Numerical optimization of natural gas and diesel dual-fuel combustion for a heavy-duty engine operated at a medium load," International Journal of Engine Research 19(6), pp. 682-696 (2018).

Zhang, et al., "A comparative study of biodiesel engine performance optimization using enhanced hybrid PSO-GA and basic GA," Applied Energy 165, pp. 676-684 (2016).

Owoyele & Pal, "A novel machine learning-based optimization algorithm (ActivO) for accelerating simulation-driven engine design," Applied Energy 285:116455, 10 pages (2021).

* cited by examiner

ACTIVE OPTIMIZATION APPROACH FOR RAPID AND EFFICIENT DESIGN SPACE EXPLORATION USING ENSEMBLE MACHINE LEARNING

CROSS-REFERENCE TO RELATED APPLICATIONS

The present invention claims the benefit of and priority to U.S. Provisional Application No. 62/884,502, titled "ACTIVE OPTIMIZATION APPROACH FOR RAPID AND EFFICIENT DESIGN SPACE EXPLORATION USING ENSEMBLE MACHINE LEARNING," filed Aug. 8, 2019, the disclosure of which is incorporated herein by reference in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present invention relates generally to methods of design optimization. Certain embodiments relate to design optimization in multi-variable design spaces using machine learning algorithms.

BACKGROUND

Many design applications involve complex interactions between numerous design parameters. In order to optimize a desired output given design parameters, a designer must determine the proper range of design parameters. One such method of determining the proper design parameters is to execute simulation iterations of design models using modeling and numerical optimization techniques. However, determining the proper design parameters in complex relationships present problems, one of which is the extraordinary computing resources required to evaluate the design parameters' effect on the desired output.

SUMMARY

At least one aspect relates to a system. The system can include one or more processors configured to generate a plurality of first data points by evaluating a function; generate a weak learner model using the plurality of first data points; generate a strong learner model using the plurality of first data points, the strong learner model different from the weak learner model; generate, using the weak learner model, at least one second data point that satisfies an optimization condition; generate, using the strong learner model, at least one third data point using an optimizer; evaluate, using the function, input values corresponding to the at least one second data point and the at least one third data point to generate a candidate optimum output; and output the candidate optimum output responsive to an output condition being satisfied.

At least one aspect relates to a method for design space optimization. The method can include generating, by one or more processors, a plurality of first data points by evaluating a function; generating, by the one or more processors, a weak learner model using the plurality of first data points; generating, by the one or more processors, a strong learner model using the plurality of first data points, the strong learner model different from the weak learner model; generating, by the one or more processors using the weak learner model, at least one second data point that satisfies an optimization condition; generating, by the one or more processors using the strong learner model, at least one third data point using an optimizer; evaluating, by the one or more processors using the function, input values corresponding to the second data point and the at least one third data point to generate a candidate optimum output; and outputting, by the one or more processors, the candidate optimum output responsive to an output condition being satisfied.

At least one aspect relates to a method of optimizing a design space. The method can include populating a random set of design points; generating a weak learner based on the design points; generating a strong learner; randomly sampling points that the weak learner predicts will be in a certain percentile of a merit function of the design space to identify promising design regions; finding the optimum design parameter in the region identified by the weak learner and adding that parameter to the points identified by the weak learner; performing function evaluations of the points identified by the weak and strong learner; and adding the new solutions to a database and repeating the foregoing steps until the optimizer converges.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

DETAILED DESCRIPTION

Embodiments described herein relate generally to methods of design optimization through the use of multi-phase machine learning ("ML") known as ActivO. Specifically, the methods described herein include adaptive surrogate-assisted optimization. In this approach, surrogate models are optimized in place of computational fluid dynamics ("CFD") simulations and are updated after each design iteration to incorporate the latest information about the design surface.

ActivO involves the use of ML models to fit the design space based on previously sampled points to determine which regions are more likely to contain the global optimum. These models are, in turn, used to predict which design parameters should be evaluated in the next design function. Because of these models, a designer spends more time and resources deciding the next point to sample so that the global optimum can be reached in fewer design functions evaluations. The result is that the designer need not run as many expensive design function evaluations because of the targeted parameter search. In other words, computational resources are concentrated in evaluating the region of the design space most likely to contain the optimal parameters.

The ActivO method uses two complimentary ML phases: a guided exploration phase and a focused exploitation phase. For guided exploration, the weak learner can be used to produce an under fitted representation that does not accurately reflect every minute detail of the actual response. During the focused exploitation stage, a stronger learner can be trained on the available data and a global optimization scheme is used to identify the optimum of the predicted surface. This is done to exploit the region identified by the weak learner. The exploitation can focus on providing highly localized information about the surface close to the optimum, while the exploration phase focuses on the broader representation, randomly exploring the region where the global optimum is likely to lie. The ActivO method is motivated by the reasoning that it is not required to have an accurate representation of the surface in the entire design space. Rather, the important information in question is where the global optimum is located.

Figure 1:
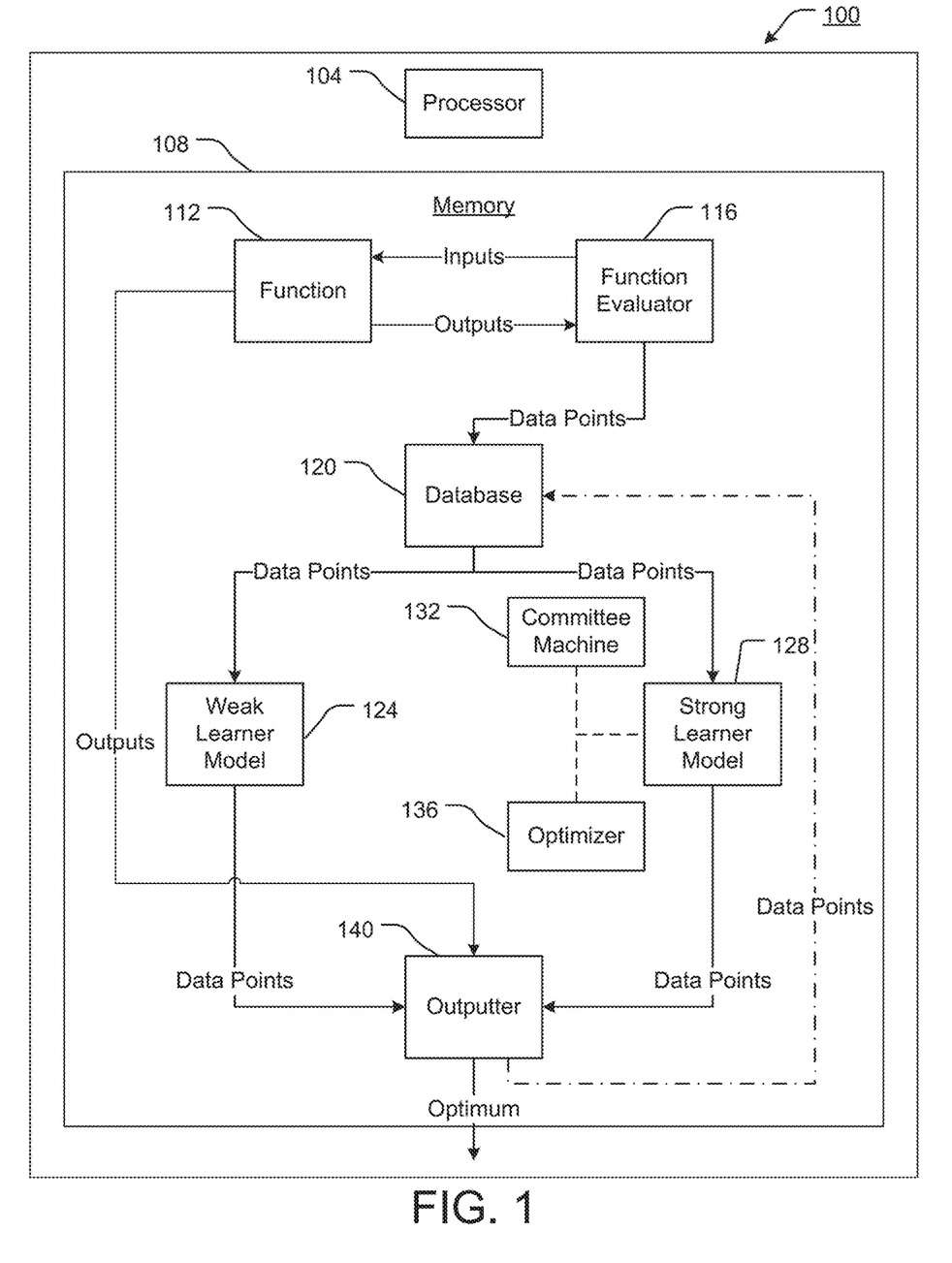
FIG. 1 is a block diagram of an example of a system for performing design space optimization.

FIG. 1 depicts a system 100 that can be used to perform design space optimization, such as to implement the ActivO method. The system 100 includes one or more processors 104 and memory 108. The processor 104 may be a general purpose or specific purpose processor, an application specific integrated circuit (ASIC), one or more field programmable gate arrays (FPGAs), a group of processing components, or other suitable processing components. The processor 104 may be configured to execute computer code or instructions stored in memory 108 (e.g., fuzzy logic, etc.) or received from other computer readable media (e.g., CDROM, network storage, a remote server, etc.) to perform one or more of the processes described herein. The memory 124 may include one or more data storage devices (e.g., memory units, memory devices, computer-readable storage media, etc.) configured to store data, computer code, executable instructions, or other forms of computer-readable information. The memory 108 may include random access memory (RAM), read-only memory (ROM), hard drive storage, temporary storage, non-volatile memory, flash memory, optical memory, or any other suitable memory for storing software objects and/or computer instructions. The memory 108 may include database components, object code components, script components, or any other type of information structure for supporting the various activities and information structures described in the present disclosure. The memory 108 may be communicably connected to the processor 104 and may include computer code for executing (e.g., by processor 104) one or more of the processes described herein. The memory 108 can include various modules (e.g., circuits, engines) for completing processes described herein. The one or more processors 104 and memory 108 may include various distributed components that may be communicatively coupled by wired or wireless connections; for example, various portions of system 100 may be implemented using one or more client devices remote from one or more server devices.

The system 100 can include a function 112. The function 112 can be a function to be optimized. The function 112 can provide a relation from inputs to outputs. The function 112 can generate an output in response to at least one input. For example, the function 112 can receive one or more inputs representing various input parameters and generate the output in response to receiving the one or more inputs. The function 112 can be used to represent any of a variety of systems, including but not limited to combustion systems. The function 112 can include one or more mappings, equations (e.g., polynomial functions, exponential functions, differential equations), lookup tables, or various combinations thereof.

The system 100 can include a function evaluator 116. The function evaluator 116 can provide the at least one input to the function 112 to cause the function 112 to generate the output (e.g., to evaluate the function 112 using the at least one input). The function evaluator 116 can include a random number generator (e.g., pseudorandom number generator) that randomly selects the at least one input to provide to the function 112. The function evaluator 116 can include a computational fluid dynamics (CFD) model. The function evaluator 116 can include a surrogate model, such as a model that may approximate behavior of the function 112 while being less computationally expensive to operate.

The function evaluator 116 can provide a number N of inputs to the function 112 to cause the function 112 to generate outputs corresponding to each of the N inputs. Each input can include one or more input parameters. For example, if the function 112 generates an output z based on input values in an x dimension and y dimension (e.g., as described with reference to FIGS. 4A-4D), the input selected by the function evaluator 116 can include an input value in the x dimension and an input value in the y dimension. The function evaluator 116 can use the N inputs to generate a design space of outputs from the function 112. For example, the design space can represent a sampling of the function 112, which can be used to generate or train various models in order to identify an optimum of the function 112. The function evaluator 116 can maintain a database 120 of data points, each data point including one of the N inputs and the output associated with the corresponding input. The N data points generated using the function 112 can be first data points.

As described further herein, the system 100 can perform an iterative process for identifying the optimum of the function 112, such as by adjusting the N data points used for subsequent generation of learner models 124, 128. For example, the N data points can be selected in a second iteration subsequent to a first iteration based on a distance from the data points of the first iteration. The distance can be a Euclidean distance, which the system 100 can maximize to select the N data points of the subsequent iteration by selecting the input values of each data point of the subsequent iteration to have a maximum Euclidean distance from the data points of the previous iteration. For example, the system 100 can generate a large number of points, Np>>N, and evaluate each of the points Np to determine whether each point satisfies the distance requirement; the system 100 may also evaluate each of the points Np to determine whether each point The system 100 can include a weak learner model 124 (e.g., first learner model). The weak learner model 124 can be generated using the N data points. The weak learner model 124 can be a model expected to underfit the N data points relative to strong learner model 128. For example, responsive to completion of generation of the weak learner model 124 (e.g., after completion of a threshold number of iterations), a measure of fit of the weak learner model 124 to the N data points can be less than that of the strong learner model 128. The measure of fit can indicate a difference between the weak learner model 124 (or an output thereof) and the N data points. The weak learner model 124 can include a learner such as a regression tree, a support vector machine, or a polynomial basis function model.

The weak learner model 124 can be used to generate numerous samples of the design space in order to identify general regions where an optimum of the function 112 may be located. The weak learner model 124 can receive one or more inputs (e.g., one or more of the N inputs) and generate an output responsive to the one or more inputs, enabling the design space to be sampled. The weak learner model 124 (and strong learner model 128) can receive the N data points from the function 112 or function evaluator 116, or retrieve the N data points from the database 120.

The weak learner model 124 can include a basis function model (BFM). The BFM can be a combination of functions, such as a linear combination, that can be combined (e.g., added together) to approximate or represent the function 112. The weak learner model 124 can include a support vector machine (SVM).

The weak learner model 124 can include a regression model. For example, the regression model can be applied to the N data points to generate a polynomial function (e.g., third-order polynomial transformation).

Figure 6:
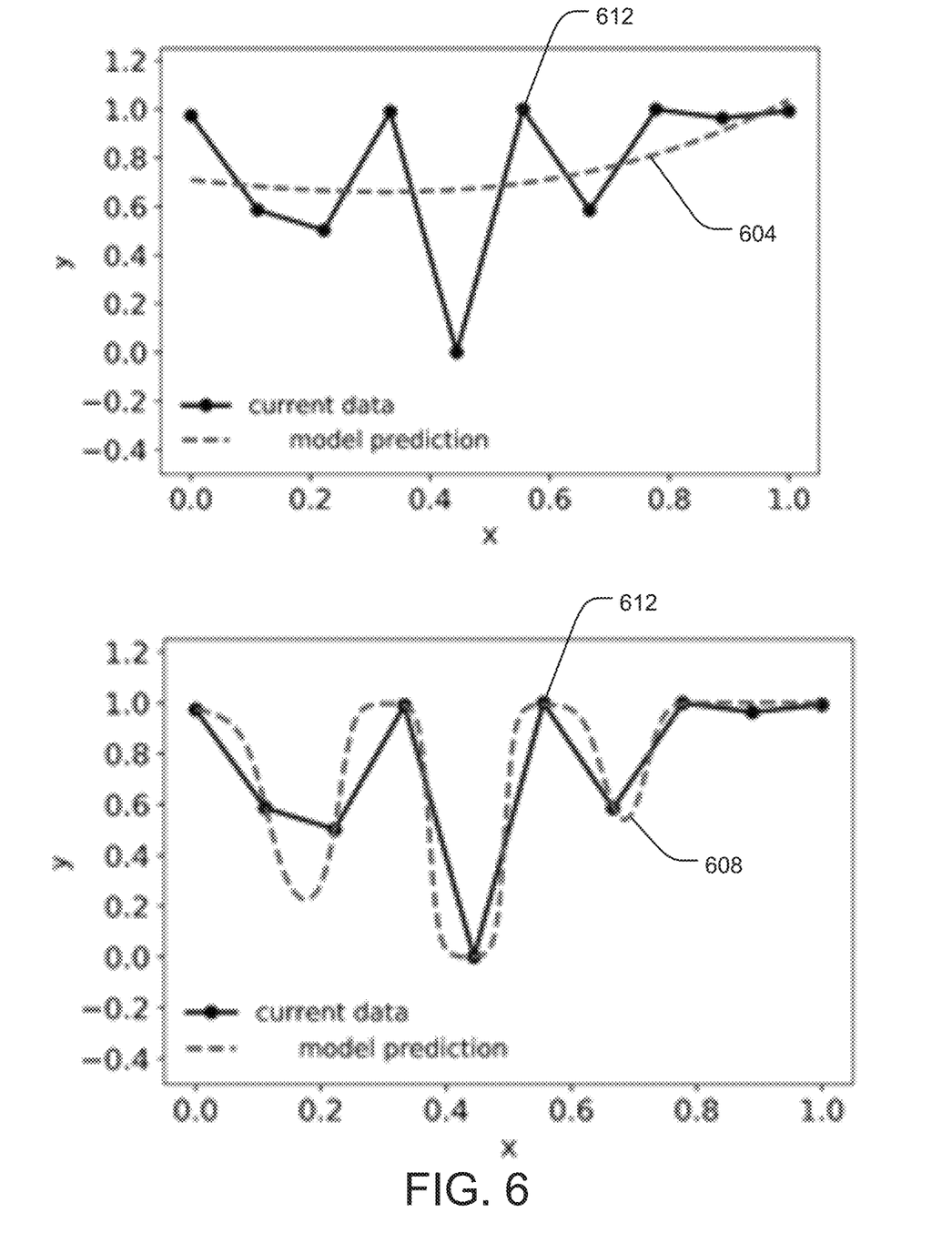
FIG. 6 shows an example of predictions of a weak learner and a strong learner generated to model data points.

The system 100 includes a strong learner model 128 (e.g., second learner model). The strong learner model 128 can also be generated using the N data points. The strong learner model 128 can be a model expected to more closely fit, including to overfit, the N data points as compared to the weak learner model 124. For example, responsive to completion of generation of the strong learner model 128 (e.g., after completion of a threshold number of iterations), a measure of fit of the strong learner model 128 to the N data points can be greater than that of the weak learner model 124. FIG. 6 illustrates an example of a weak learner 604 as compared to a strong learner 608 generated based on data points 612, indicating a greater measure of fit by the strong learner 608 than the weak learner 604. The strong learner model 128 can include a machine learning model. The strong learner model 128 can include any of a variety of models, including tree-based algorithms (e.g., random forest model), gradient boosting machines, and other methods that use boosting.

The strong learner model 128 can include an artificial neural network (ANN). The ANN can include a plurality of layers, each including one or more nodes (e.g., neurons, perceptrons), such as a first layer (e.g., an input layer), a second layer (e.g., an output layer), and one or more hidden layers. The N data points can be provided as input to the input layer to train the ANN, such as by causing the ANN to generate candidate output based on the inputs of the N data points, and adjusting at least one weight or bias of the ANN based on a comparison of the candidate output and the actual output of the N data points.

Subsequent to being trained, the strong learner model 128 can be used to predict an optimum of the function 112. For example, an optimizer 136 (e.g., optimization function, optimization algorithm, global optimizer) can provide inputs to the strong learner model 128 to cause the strong learner model 128 to generate various outputs, and adjust the inputs provided to the strong learner model 128 to search for the optimum of the function 112.

In some instances, the ANN can be prone to overfitting. The strong learner model 128 can include a committee machine 132 and a plurality of ANNs that the committee machine 132 uses to generate a predicted output from the plurality of ANNs. For example, the committee machine 132 can initialize each ANN of the plurality of ANNs with different weights (or biases), and cause each ANN to be trained using the N data points. Subsequent to training the plurality of ANNs, the committee machine 132 can cause each ANN to generate a candidate predicted output, such as to predict an optimum value of the function 112. The committee machine 132 can receive the candidate predicted output from each of the ANNs, and output a predict output based on the candidate predicted outputs generated by each respective ANN. For example, the committee machine 132 can average the candidate predicted outputs to generate the predicted optimum value.

The system 100 can sample the weak learner model 124 (e.g., subsequent to generating the weak learner model 124) to identify candidate second data points (e.g., N−p second data points) that may represent the optimum of the function 112. For example, the system 100 can provide input values to the weak learner model 124 to cause the weak learner model 124 to generate second data points using the input values. The system 100 can randomly select the input values, or select the input values using a Euclidean distance as described above. The system 100 can sample the weak learner model 124 to generate N−p second data points.

The system 100 can sample the weak learner model 124 to generate at least one N−p second data points that satisfy a threshold value. The threshold value can be a minimum threshold that is satisfied by being met or exceeded (e.g., if the function 112 is to be optimized by identifying a maximum of the function 112) or a maximum threshold that is satisfied if the value is less than or equal to the maximum threshold. For example, the threshold value can be a cutoff value $\lambda_k$ such that data points having values that are in the $(100-k)^{th}$ percentile of the values of the N data points (e.g., all of the data points from the previous iteration). The cutoff k can be greater than or equal to five and less than or equal to twenty. The cutoff k can be modified through each iteration. The system 100 can provide an input to the weak learner model 124, compare an output generated by the weak learner model 124 responsive to the input to the threshold value, and use the input and output as as one of the N–p a second data point(s) responsive to the output satisfying the threshold value (e.g., if k is fifteen, responsive to the output being in the $85^{th}$ percentile relative to the N data points used to generate the weak learner model 124) or provide a new input to the weak learner model 124 responsive to the output not satisfying the threshold value. The system 100 can repeatedly provide inputs to the weak learner model 124 to identify data points that satisfy the threshold value until a completion condition is achieved (e.g., until N–p second data points are identified).

The system 100 can use the strong learner model 128 to generate at least one third data point (e.g., p data points, such that the weak learner model 124 generates N–p and the strong learner model 128 generates p data points, resulting in N total data points generated by the models 124, 128). For example, the system 100 can use the optimizer 136 to cause the strong learner model 128 to generate a candidate optimum data point. The at least one third data point, together with the at least one second data point generated by the weak learner model 124, can represent predictions of an optimum of the function 112 (based on the respective weak learner model 124 and strong learner model 128, rather than the function 112 itself).

Having generated the candidate optimum data points as candidate optima of the function 112 (e.g., generating the N–p second data point from the weak learner model 124 and the p third data point from the strong learner model 128), the system 100 can use the candidate optimum data points to evaluate the function 112. For example, the system 100 can provide input values corresponding with each respective second data point and third data point as inputs to the function 112 to cause the function 112 to generate outputs using the inputs.

The system 100 can dynamically adjust a balance between exploration (e.g., generating outputs using the weak learner model 124) and exploitation (e.g., generating outputs using the strong learner model 128). For example, the system 100 can dynamically adjust the number of data points N–p, p generated by the weak learner model 124 and strong learner model 128 in each iteration, which may enable more effective exploration of the design space and convergence to the optimum of the function 112. The system 100 can adjust the number of data points N–p, p such that N–p decreases and p increases as the system 100 progresses through successive iterations.

The system 100 can maintain a measure of effectiveness of the models 124, 128 in determining the optimum of the function 112, and adjust the number of data points N–p, p responsive to the measure of effectiveness. The system 100 can determine the measure of effectiveness based on maintaining at least one monitor point for the function 112. The system 100 can select the at least one monitor point randomly. The system 100 can select the at least one monitor point from second data points identified to satisfy the threshold value (e.g., select the at least one monitor point randomly from amongst the second data points). The system 100 can select the at least one monitor point to include at least some of the second data points identified to satisfy the threshold value (e.g., in a first iteration). The system 100 can select the at least one monitor point by identifying candidate second data points satisfying a threshold value less than the threshold value associated with the cutoff value $\lambda_k$.

The system 100 can determine the measure of effectiveness based on a change in a value of the weak learner model 124 as evaluated at the at least one monitor point. For example, the measure of effectiveness can be determined as 100 times $(\varphi_i - \varphi_{i-1})/\varphi_{i-1}$ for each monitor point of the at least one monitor point, where i represents an index of the iteration being evaluated, and where input values associated with each at least one monitor point are provided as input to the weak learner model 124 to be evaluated by the weak learner model 124. The system 100 may determine the measure of effectiveness to be $\omega$=maximum of $100*(\varphi_i - \varphi_{i-1})/\varphi_{i-1}$ as evaluated for all monitor point(s). The value of $\omega$ can thus represent how much the outputs of the weak learner model 124 change over successive iterations, such as how much the outputs of the weak learner model 124 change in promising regions in which the optimum is expected to be located (e.g., depending on how the at least one monitor point is selected).

The system 100 can adjust p (which will in turn adjust N–p) based on the measure of effectiveness. For example, the system 100 can compare the measure of effectiveness to a threshold measure, and increase p responsive to the measure of effectiveness being less than the threshold measure. The threshold measure may be greater than or equal to one percent and less than or equal to twenty percent. The threshold measure may be greater than or equal to three percent and less than or equal to ten percent. The threshold measure may be five percent. As such, as the values outputted by the weak learner model 124 for the at least one monitor point change less across iterations, the system 100 can increasingly use data points from the strong learner model 128 to converge towards the optimum of the function 112. In an example, the system 100 implements a multi-stage process as the measure of effectiveness changes (e.g., as $\omega$ decreases), such as by performing a full exploration stage (e.g., p=zero) responsive to $\omega$ being greater than a first threshold, performing a balanced exploration-exploitation stage (e.g., 4p=N) responsive to $\omega$ being less than the first threshold and greater than a second threshold, and performing an intensive exploitation stage (e.g., p=N–p) responsive to $\omega$ being less than the second threshold; various numbers of iterations may be performed at each stage, the stages being dynamically reached as $\omega$ changes over iterations.

The system 100 can include an outputter 140 that determines whether to output an optimum of the function 112 based on the inputs provided to the function 112 corresponding to the at least one second data point and the at least one third data point. The outputter 140 can evaluate the outputs generated by the function 112 (using inputs corresponding to the second data points and the third data point) to determine whether an output represents an optimum of the function 112. The outputter 140 can monitor various conditions to determine whether to output the optimum. For example, the outputter 140 can monitor at least one convergence condition, which may indicate whether solving for the optimum has converged based on factors such as changes in the value of the optimum identified in each iteration, or whether a threshold number of iterations has been performed. Responsive to the convergence condition being satisfied, the outputter 140 can output the optimum.

Responsive to the convergence condition not being satisfied, the outputter 140 can use the at least one second data point and the at least one third data point to generate (e.g., update) the weak learner model 124 and strong learner model 128. For example, the outputter 140 can add the N–p second data point(s) and the p third data point(s) to the database 120. The outputter 140 can label each data point added to the database 120 with the iteration in which the data point was generated. This can enable the weak learner model 124 and strong learner model 128 to selectively retrieve data points from the database 120 for generating the weak learner model 124 and strong learner model 128, such as to only use the data points from the previous iteration (which can enable the weak learner model 124 and strong learner model 128 to focus on potential regions in which the optimum may be located over successive iterations, as the cutoff value $\lambda_k$ may converge towards the optimum over successive iterations). The weak learner model 124 and strong learner model 128 may use different groups of data points to be generated or trained; for example, the weak learner model 124 may use the N data points from the previous iteration, while the strong learner model 128 may use all data points from all iterations.

Figure 7:
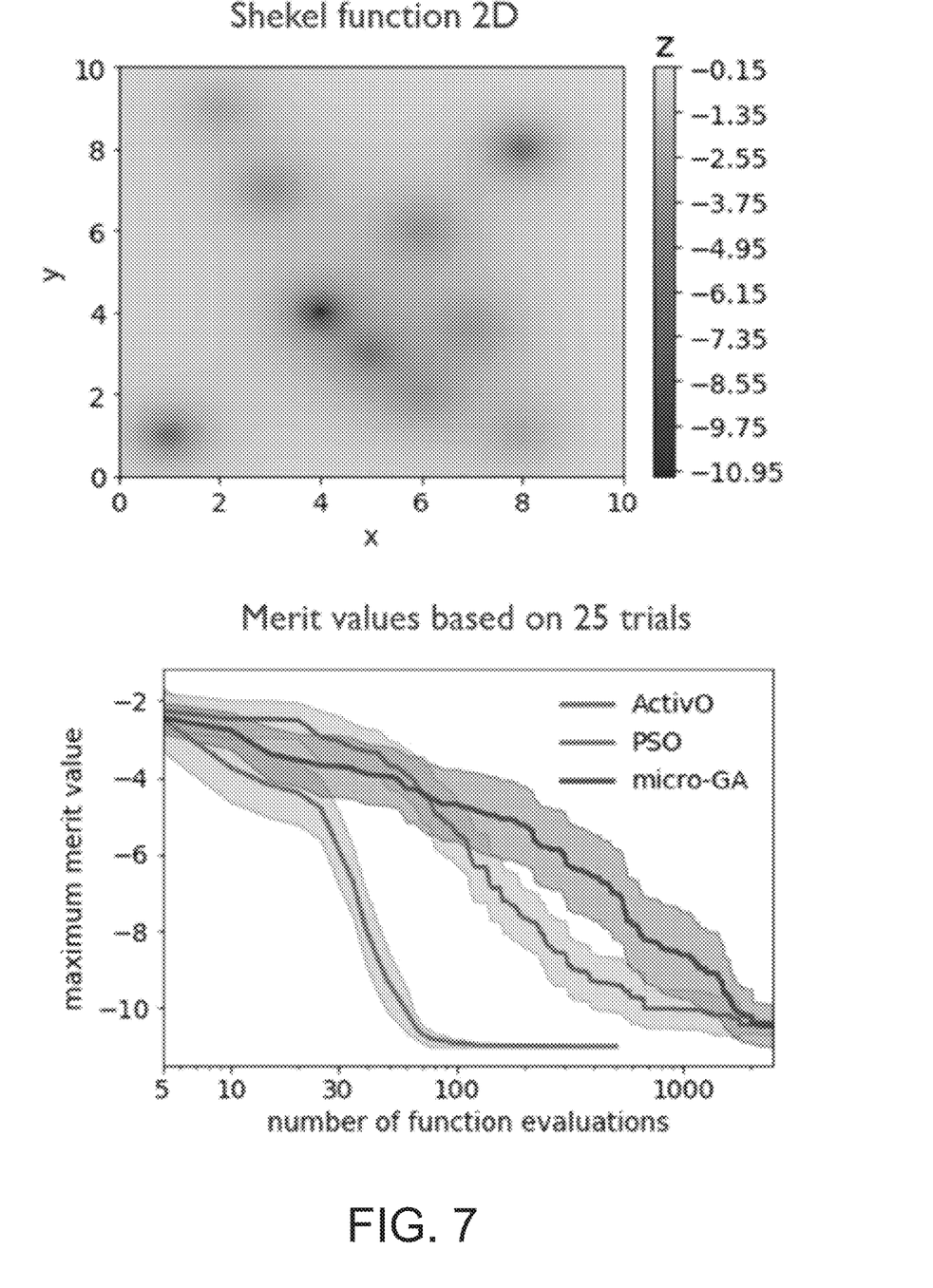
FIG. 7 shows global optimum found using ActivO and dynamic adjustment between exploration and exploitation phases along with the evolution of maximum objective function versus the number of function evaluations for ActivO, μGA, and PSO.

The outputter 140 can use the measure of effectiveness to determine whether the convergence condition is satisfied, as the measure of effectiveness can indicate whether solutions generated by the models 124, 128 are tending to change or not change (e.g., change or converge). For example, the outputter 140 can determine the convergence condition to be satisfied responsive to the measure of effectiveness being less than a threshold measure of effectiveness for a predetermined number of iterations. The outputter 140 can identify the predetermined number of iterations based on maintaining a count of consecutive iterations for which the measure of effectiveness is less than the threshold measure of effectiveness, or a count of iterations out of a predetermined number of potential iterations (e.g., five consecutive iterations; seven of nine iterations). For example, the outputter 140 can determine the convergence condition to be satisfied responsive to ω being less than five percent for five consecutive iterations. FIG. 7 depicts twenty-five trials using ActivO to optimize a Shekel function while implementing dynamic adjustment between exploration and exploitation phases. As shown in FIG. 7, implementing ActivO with the dynamic adjustment between exploration and exploitation phases can enable significant performance improvements (e.g., in terms of function evaluations performed to converge towards the optimum of the Shekel function) as compared to PSO and μGA.

Figure 2:
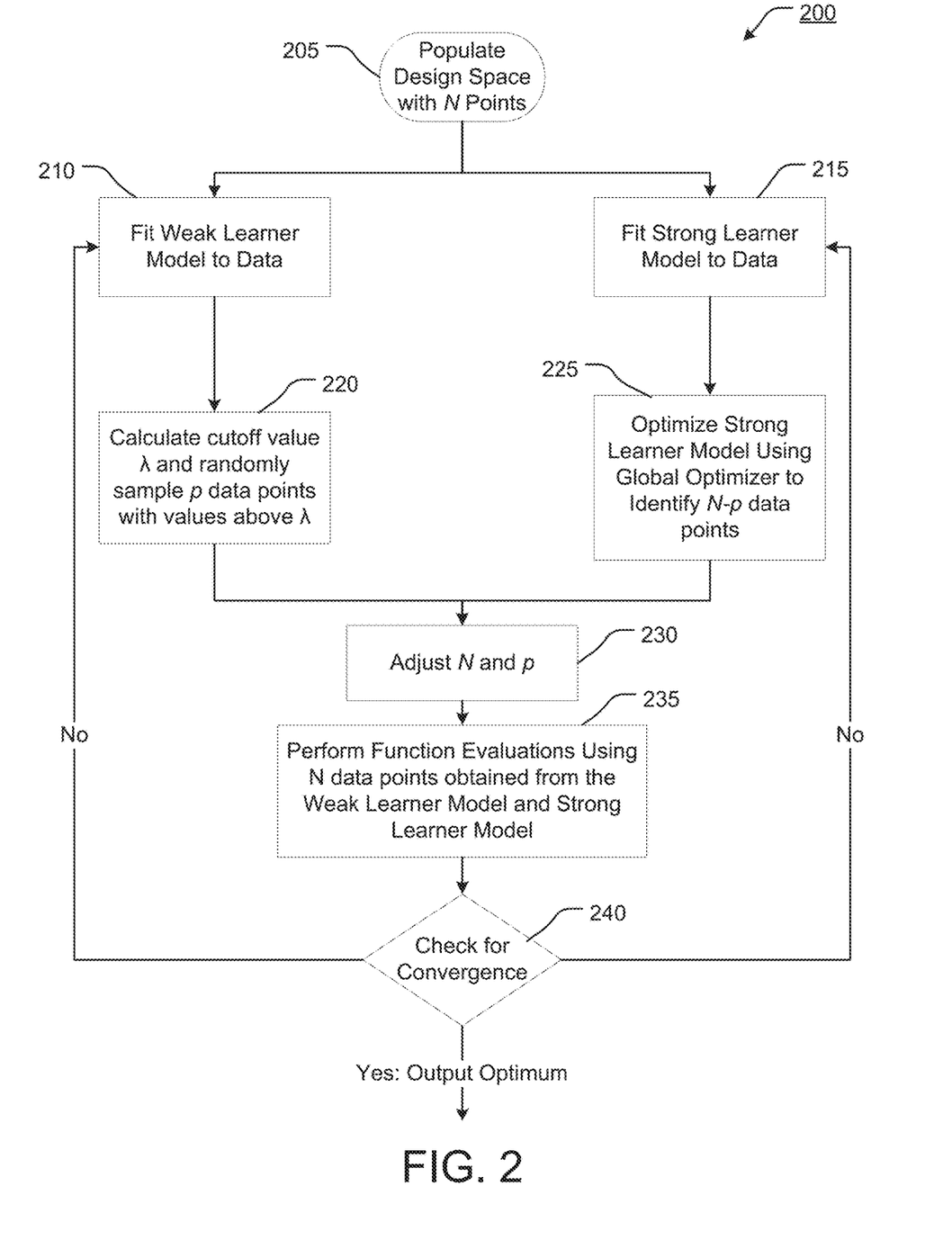
FIG. 2 is a flow chart of an example embodiment of an Active Optimization ("ActivO") method.

FIG. 2 depicts a method 200 for design space optimization, such as for implementing ActivO. Briefly, the method 200 can include 1) populating a design space with random N design points evaluated by a function evaluator (205); 2) generating a weak (e.g., first) learner model using available data (210); 3) generating a strong (e.g., second) learner model using available data (215); 4) randomly sampling points that the weak learner predicts will be above a selected merit/objective value ($\lambda$) based on a merit/objective value function (220); 5) finding the optimum predicted by strong learner based on the random sample points in step 4 using a global optimization scheme and adding the parameter identified in step five to the N points to be evaluated by the design function (225); 6) dynamically adjusting counts of data points to be generated in a subsequent iteration by the weak learner model and strong learner model (230); 7) performing design function evaluations on N (235); and 8) adding the design solution to a database and repeating steps 2-8 until the method converges or a maximum number of iterations is reached (240). It should be appreciated that the order of the steps in the method are just one example and may comprise intermediate steps or be performed in a different order.

A random search can be performed in regions where the optimum is likely to lie, based on current information about the response surface. This makes use of an aristocratic strategy, where a large pool of random nominee points may be generated in the design space, and only those that meet a minimum merit value ($\lambda$) are chosen. While ground-truth information about the merit values of nominees may not be available, the best performing points can be identified based on the current surface predicted by the weak learner. The merit values of the nominees are computed using the weak learner and then sorted in descending order. Among these, the top k-percent are considered, from which a cutoff criterion ($\lambda k$) that represents the merit value required to be in the $(100-k)^{th}$ percentile of nominees can be defined. The input parameters used in the exploration phase of the next design iteration can be constrained to come from the region demarcated by the $\lambda > \lambda k$. It should be noted that this step can be relatively inexpensive since the evaluation of the merit functions, in this case, is based on the weak learner.

The function evaluator, as described herein, can be the computation of the system output for a given design parameter (e.g., input value provided to the function to be evaluated). The function evaluator can be, for example, a CFD simulation, an experiment, or a surrogate model. The merit function, as described herein, is the function optimized based on the function evaluator. Instead of engaging with a function evaluator or simulation directly, the merit function in a surrogate-assisted optimization can engage with a ML model or a surrogate model for the function evaluator. Thus, references to a function evaluator can be understood to refer to a surrogate model.

Referring to FIG. 2 in greater detail at 205, a large pool of random N points in the design space can be generated and evaluated using the function evaluator (e.g., step one). These points establish an initial set of data.

At 210, a weak learner can be trained using existing data (e.g., step two). The weak leaner may be a basis function model ("BFM"). It should be appreciated that the weak learner may, in another example, be a different model, such as a support vector machine. It should also be appreciated that the weak learner is not intended to provide every detail of the design space. For example, the weak learner may be a third-order polynomial transformation trained using a regression model. In subsequent design iterations, the weak learner can be trained based on function evaluations of points identified in previous iterations.

At 215, a strong learner can be trained and modeled to fit all the data points available (e.g., step three). The strong learner may, for example, include one or more artificial neural networks ("ANNs"). It should be appreciated that the strong learner may also be a tree-based algorithm. A committee machine can be used to operate multiple ANNs. The high predictive capability of ANNs carries the caveat of making them prone to overfitting, which makes ANNs in the applications described herein prone to overfitting in sparse, non-promising regions. Thus, the overfitting can produce a number of false optima for the predicted design surface. In such cases, the optimum predicted from the region exploited by the ANN surface is unrelated to the actual surface and occurs as a result of the sparsity of samples in the region of this false optimum.

To solve this problem, the ANNs can use a committee machine. The committee machine can train multiple networks with different initial weights in parallel and combine the output from individual predictors to get an overall prediction. The prediction of a committee machine made up of M networks is:

$$\varphi(x) = \sum_{i=1}^{M} \varphi_i / M$$

where $\varphi_i$ is the prediction from ANN i, and $\varphi(x)$ is the overall prediction. The reasoning behind using a committee machine is that overfitting, due to its nature, is not likely to be repeatable since it is non-physical. If the data is fit using a network with different initial conditions or optimizer parameters, then overfitting will often occur at a different region or may occur at significantly lower levels. It is expected that the prediction of the networks will have a higher standard deviation in sparse regions while they agree at regions of relative certainty where the data is sufficiently dense. In subsequent design iterations, the strong learner is trained based on function evaluations of points identified in previous iterations. At least three networks can be used in the committee machine.

At 220, the guided exploration phase is implemented (e.g., step four). For guided exploration, the weak learner provides a general measure of the merit function of the region in the neighborhood of a point. It acts as a guide to regions of space where random sampling is to be performed. The exploration phase is implemented with a BFM as a weak learner, as also discussed in step two. It should be appreciated that the weak learner may, in another example, be a different model, such as a support vector machine. For example, the weak learner may be a third-order trained using another regression model.

The exploration phase using the weak learner produces regions of the design space that are likely to produce a design optimum. The designer defines the merit value function to optimize relationship among design parameters defined by the function evaluator. The output of the merit function is a merit value ($\lambda$). For example, the merit value function can be based on ML models trained on simulations. The weak learner then computes a merit value ($\lambda$) for the points in N. A cutoff merit value ($\lambda_k$) represents the merit value required to be in the $(100-k)^{th}$ percentile of the N pool. The top k-percent of results are considered, which defines $\lambda_k$ on the lower bound. Furthermore, while k is a parameter that may be arbitrarily chosen, specific embodiments where k is chosen within reasonable bounds of 5-20 provide ActivO with a good performance. In the experiments described below, k was chosen as 15 for demonstrative purposes, and so random sampling was constrained to regions where the merit value was projected to be above the $85^{th}$ percentile. As the optimization progresses and more information about the design surface is realized, the weak learner further defines the points in N as those predicted to be above $\lambda_k$, which, ultimately, further guides the strong learner in evaluating parameters in the design space. As discussed in step one, the N points used in the exploration phase of any subsequent design iterations can be constrained to points predicted to have $\lambda > \lambda_k$.

At 225, the focused exploitation phase is implemented (e.g., step five). During the exploitation phase, a strong learner can use the available data to exploit the promising region identified by the weak learner to obtain an optimum value in the region (e.g., as the weak learner generates points predicted to have $\lambda > \lambda_k$ over successive iterations, these data points can be used to train the strong learner to help the strong learner focus on the promising region). The focused exploitation phase can be implemented with an ANN as a strong learner. The optimum point on the strong learner's surface can be determined by using a global optimization scheme. The global optimization scheme may be any global optimizer. After the scheme determines the optimum, the optimum is added to N points identified by the weak learner. As discussed further herein, a number of optima p to be added to the points identified by the weak learner can be adjusted dynamically to adjust balance between exploration and focused exploitation.

Figure 4A:
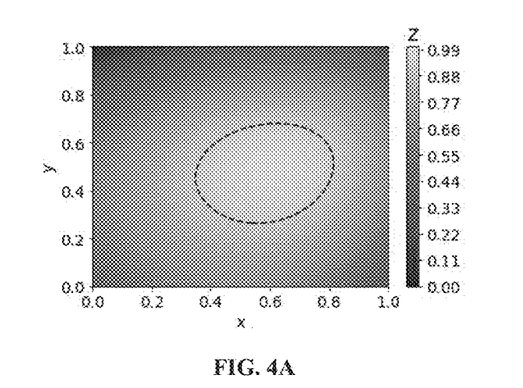
FIG. 4A shows the promising region predicted by the weak learner to contain the optimum parameters in a design iteration in one implementation of ActivO.
Figure 4B:
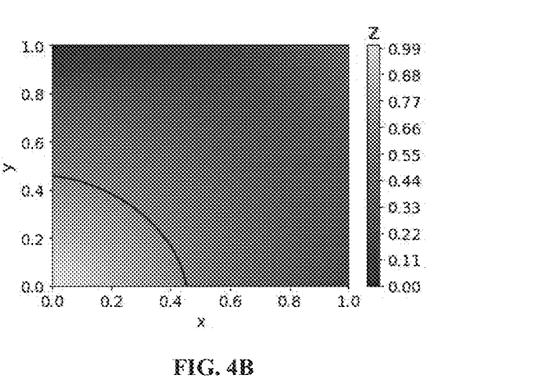
FIG. 4B shows the promising region predicted by the weak learner to contain the optimum parameters in subsequent design iterations in the same implementation of ActivO shown in FIG. 4A.

As the optimization progresses with subsequent iterations, the strong learner's model uncovers information that the weak learner will use in subsequent design iterations to randomly sample the promising regions. And as the strong learner is trained on additional points close to the optimum that are randomly sampled by the weak learner, the strong learner fits the regions identified by the weak learner faster due to the amount of information close to the optimum. This effect highlights the complimentary nature of the models, as shown in FIGS. 4A and 4B.

At 230, the number of points to be generated from the weak learner and the strong learner can be dynamically adjusted, such as for the number of points to be generated in subsequent iterations. For example, at least one monitor point in the design space can be monitored by providing input values corresponding to the at least one monitor point as input to the weak learner, in order to determine corresponding output for the at least one monitor point. The output for the at least one monitor point can be compared to a respective output from a previous iteration to determine a change in the output for the at least one monitor point. As the change in the output decreases, the number of points p to be generated using the strong learner can be increased, while a number of points N−p (e.g., such that N is a total number of points to be generated in the subsequent iteration) can be decreased; or vice versa.

At 235, function evaluations are performed on promising parameters identified in steps four and five (e.g., step seven). For example, input values from N data points corresponding to the N−1 data points generated using the weak learner and the predicted optimum generated by the strong learner can be provided to the function to evaluate the function. The output generated by evaluating the function using the input values from the N data points can represent candidate optima of the function.

At 240, the solutions obtained from the function evaluations are added to a database (e.g., step 8). In each iteration, the $\lambda$ obtained for a given point in N evaluated by the function evaluator can be added to the database, which can be used to train the weak and strong learners in subsequent iterations to converge on an optimum design point. As such, the design points used in the next design iteration can be constrained to come from the region demarcated by $\lambda > \lambda_k$.

In the next design iteration, where a new pool of N points is generated (e.g., based on dynamic adjust of N−p points to be generated by the weak learner and p points to be generated using the strong learner), the new N may comprise points farthest in the design space from the points already sampled instead of by random. The new N may be selected, in addition to being predicted above the current $\lambda_k$, by maximizing the Euclidean distance ($d_{min}$) from the previously sampled data points, as defined by:

$$x_{new} = \mathrm{argmax}(d_{min})$$

This results in new points that are not close to points already sampled. This also helps the optimizer in escaping local optima. In situations where the region defined by $\lambda_k$ suddenly expands due to new information about the design space, maximizing the distance will tend to explore the extreme portions of the new boundary. Thus, maximizing distance between points promotes a balanced exploration of the design space during the exploration phase. The iteration described in steps two to six can be repeated until the optimizer converges or reaches a predetermined maximum number of iterations.

Experimental Results.

2-D Multi-Modal Merit Surface.

In the following example experiments, a set of third order polynomial transformations of the original variables was used as the basis set for the BFM. This model was trained using a regression model, in this particular example a Ridge regression model. Since the polynomial is only third order, it is limited in the amount of surface detail it can fit and acts as the weak learner. On the other hand, ANNs were used as the strong learner. In this work, k was chosen as 15 for demonstrative purposes, and so random sampling was constrained to regions where the merit value was projected to be above the 85$^{th}$ percentile.

In one example experiment, ActivO was applied to find the input parameters that correspond to the maximum objective function for a 2-D surface. The test case chosen here is a challenging multi-modal problem for which the global optimum is known. The function is described by:

$$f_x = \exp\left(\frac{-4\log 2(x - 0.0667)^2}{0.64}\right) \sin(5.1\pi x + 0.5)^6$$

$$f_y = \exp\left(\frac{-4\log 2(x - 0.0667)^2}{0.64}\right) \sin(5.1\pi y + 0.5)^6$$

$$z = f_x f_y$$

Figure 3:
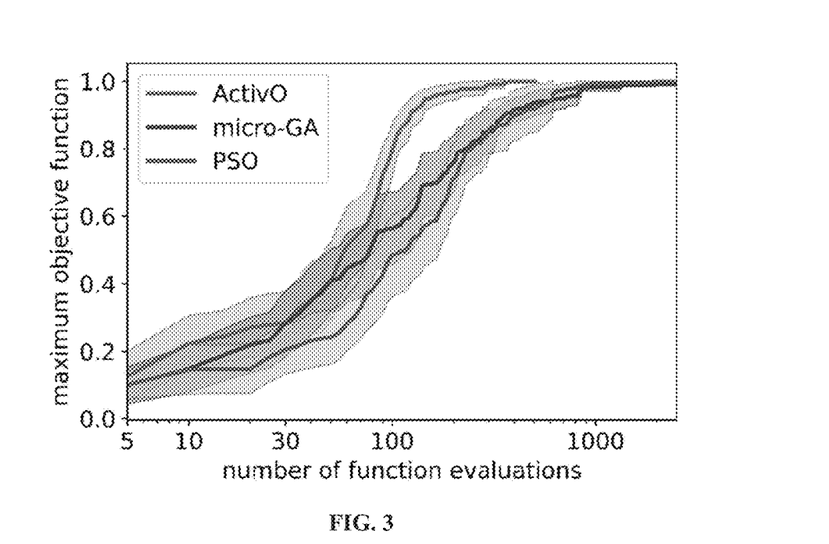
FIG. 3 is a graph of the evolution of maximum objective function versus the number of function evaluations for ActivO, micro-genetic algorithm ("µGA"), and particle swarm optimization ("PSO").

In FIG. 3, the maximum objective function evolution versus the number of objective function evaluations is shown for ActivO and compared with μGA and PSO. Each design iteration consisted of 5 function evaluations in parallel, and for this problem, 25 trials were run. The solid lines in FIG. 3 represent the average value of the maximum objective function over the 25 trials, while the shaded regions around the solid lines depict the objective function values represented by a 95% confidence interval. For μGA, micro-convergence was assumed to be reached whenever the variation in the chromosomes of a given generation became less than 5%. For PSO, the inertia weight, which determines the balance between exploration and exploitation was set to 1.0 for this problem to allow for more exploration. In particular, it was found that the performance of PSO was highly sensitive to the inertia weight: for lower values, the algorithm got trapped in local maxima more often than not.

Figure 4C:
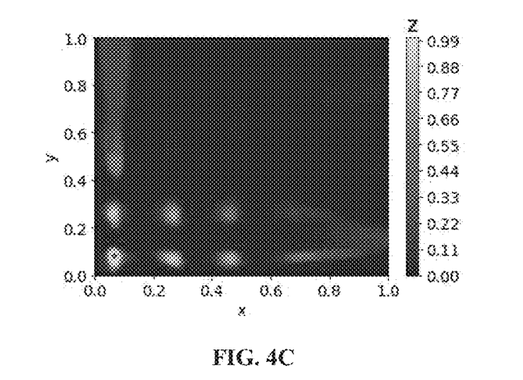
FIG. 4C shows global optimum found by the strong learner in the same implementation of ActivO shown in FIGS. 4A and 4B.
Figure 4D:
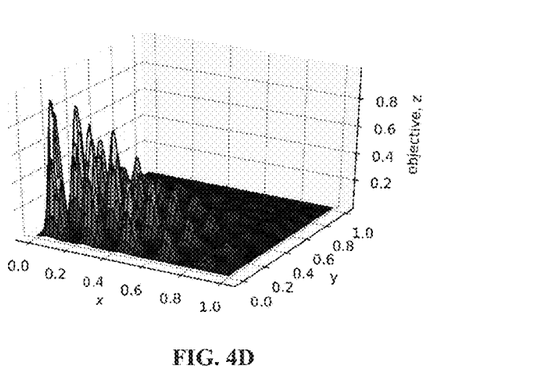
FIG. 4D shows a surface plot containing 25 peaks of a merit function in the same implementation as FIGS. 4A-4C. Any one of the 25 peaks can potentially act as a local maxima.

The function has 25 peaks that can potentially act as local maxima and trap an optimizer, as shown in FIG. 4D. The results show that on average, ActivO performs much better than μGA and PSO in terms of reaching the global optimum faster. The maximum objective function value at the local maxima surrounding the global optimum was ~0.84, so it was assumed that the optimizer had reached very close to the actual global optimum when it crossed this threshold. Considering this cut-off, it can be seen from Table 2 that it takes around 60 iterations for the μGA and PSO to correctly find the region where the global optimum lies, while ActivO is able to identify this region much faster (about 22 iterations). More pronounced, however, is the difference in the number of iterations it takes to reach the actual global optimum once the optimizer is in the vicinity of the global optimum. For this problem, it was assumed that the global optimum has been found when the merit value reaches 0.99. Evidently, ActivO takes a total of 60 design iterations on average (300 function evaluations) to reach a maximum merit value of 0.99, while the PSO takes 183 iterations and μGA takes 396 iterations (915 and 1980 function evaluations, respectively). Table 1 includes maximum merit values averaged over multiple trials. It should be noted that individual trials may sometimes reach the optimum in a fewer number of function evaluations. However, in general, ActivO converges significantly faster than the PSO and μGA, and this difference is compounded by the fact that there were some cases where PSO and μGA took an unusually large number of function evaluations to reach the global optimum. Furthermore, it is observed that for a given problem, once ActivO is in the vicinity of the global optimum, the solution gets refined fairly quickly and reaches the 0.99 mark, as compared to μGA and PSO. The number of iterations it takes to reach 0.99 is 2.7 times the number it takes to reach 0.85, while this number is about 6.7 for μGA and 3 for PSO. This is because the ActivO technique involves fitting an ANN on data which has a lot of information about the topology of the surface close to the optimum, due to the constrained random sampling.

TABLE 1

Performance of ActivO compared to μGA and PSO.

| Maximum Merit Value | Number of Generations | | |
|---|---|---|---|
| | ActivO | GA | PSO |
| 0.99 | 60 | 396 | 183 |
| 0.95 | 31 | 144 | 124 |
| 0.9 | 25 | 72 | 81 |
| 0.85 | 22 | 59 | 60 |

Contour plots of the objective function predicted by the BFM and the committee machine are shown in FIGS. 4A-3D. FIG. 4A shows the surface predicted by the BFM at the initial design iteration, while FIG. 4B shows the surface predicted by the BFM at the end of the optimization process after the global optimum has been successfully found. The black lines in FIGS. 4A and 4B are isolines showing the boundary that separates the promising region from the other regions, which The BFM predicts that the points within this region lie in the 85th percentile of all points evaluated. The boundary moves as more information is gained about the actual surface, from the dotted line as shown in FIG. 4A to the solid line in FIG. 4B. It can be seen that as the optimization progresses, the BFM is able to identify that points sampled in the bottom left corner of the contour plots are better than other areas. The random sampling is thus concentrated in this region, and the committee machine (FIG. 4C) is able to predict the topology in this region fairly accurately. However, a comparison of FIG. 4C and FIG. 4D shows that the surface predicted by the ANN is not accurate everywhere. This is because in order to find the optimum, a surrogate model that accurately fits the entire surface is not necessary. At a minimum, what is needed is a surface that is accurate enough to not lead to a false global optimum outside the region defined by $\lambda_k$, and a qualitatively accurate surface within the region defined by $\lambda_k$.

Engine Simulation.

In a second example experiment, ActivO was applied to an engine combustion optimization case where the goal was to minimize fuel consumption by a heavy-duty engine operating on a gasoline-like fuel, while satisfying the constraints on emissions ($NO_x$ and soot in g/kW-hr), peak cylinder pressure ("PMAX" in bar), and maximum pressure rise rate ("MPRR" in bar/CA). The nine input parameters included in the design space along with their considered ranges are listed Table 2 below. A merit function was defined to quantify the overall performance of a particular engine design as shown below. A ML surrogate model for the merit function response surface was developed, which was trained on 2048 engine CFD simulations. This surrogate model was then coupled with a GA to optimize the input parameters within the nine-dimensional design space so that the merit value was maximized. ActivO only needed 16 iterations for the optimizer to converge on the merit value of 104.

TABLE 2

Input parameters for engine combustion optimization study.

| Parameter | Description | Min | Max | Units |
|---|---|---|---|---|
| nNoz | Number of nozzle holes | 8 | 10 | — |
| TNA | Total nozzle area | 1 | 1.3 | — |
| $P_{inj}$ | Injection pressure | 1400 | 1800 | bar |
| SOI | Start of injection timing | −11 | −7 | ° CA ATDC |
| NozzleAngle | Nozzle inclusion angle | 145 | 166 | degrees |
| EGR | EGR fraction | 0.35 | .5 | — |
| $T_{ivc}$ | IVC temperature | 323 | 373 | K |
| $P_{ivc}$ | IVC pressure | 2.0 | 2.3 | bar |
| SR | Swirl ratio | −2.4 | −1 | — |

A function evaluator in the example engine experiment used the merit function given by:

$$\text{Merit} = 100 * \left\{ \frac{160}{ISFC} - 100 * f(PMAX) - 10 * f(MPRR) - f(SOOT) - f(NO_x) \right\}$$

where:

$$f(PMAX) = \begin{cases} \frac{PMAX}{220} - 1, & \text{if } PMAX > 220 \\ 0, & \text{if } PMAX \leq 220 \end{cases}$$

$$f(MPRR) = \begin{cases} \frac{MPRR}{15} - 1, & \text{if } MPRR > 15 \\ 0, & \text{if } MPRR \leq 15 \end{cases}$$

$$f(SOOT) = \begin{cases} \frac{SOOT}{0.0268} - 1, & \text{if } SOOT > 0.0268 \\ 0, & \text{if } SOOT \leq 0.0268 \end{cases}$$

$$f(NO_x) = \begin{cases} \frac{NO_x}{1.34} - 1, & \text{if } NO_x > 1.34 \\ 0, & \text{if } NO_x \leq 1.34 \end{cases}$$

Figure 5:
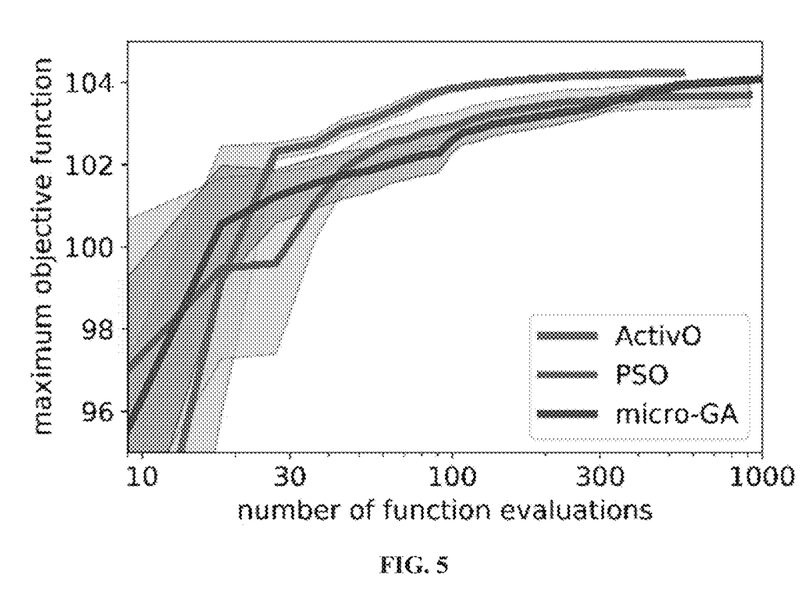
FIG. 5 shows the evolution of maximum objective function versus the number of function evaluations for ActivO, μGA, and PSO.

The results obtained from applying ActivO to the optimization of the engine surrogate model are discussed and compared with those of PSO and µGA. In FIG. 5, the evolution of the maximum merit value versus the number of evaluations for the three optimization algorithms are shown. The solid lines in the plots represent the average results from 25 trials, whereas the shaded regions around the plots represent a 95% confidence interval. For this problem, the inertia weight for PSO was set to 0.8, a different value from what was used for the 2-D multi-modal test problem (as shown above) because the algorithm performed badly using the previous value of 1.0. Thus, in addition to the sensitivity of the performance of PSO to the inertia weight for a given problem, the performance is also sensitive across different problems. In contrast, for ActivO the same parameters were used for both problems and the results obtained were superior to those obtained using PSO and µGA for these constant optimizer parameters. For this case, 9 evaluations were used for each design iteration in line with the previous study by Moiz, et al.

As shown in FIG. 5, ActivO requires fewer iterations to reach a given maximum merit value and is also able to find a higher merit value than the other two algorithms for a given number of function evaluations. For testing purposes, a merit value of 104.0 (close to a global optimum of 104.32, obtained from extensive searching of the design space) was chosen to compare the three methods. It takes only 16 iterations for the mean maximum merit value to cross the 104.0 threshold in case of ActivO, while it takes µGA about 80 iterations to cross this threshold and PSO never reaches 104.0 within the 100 iterations it was run for. The maximum average merit value it reaches is 103.7. Thus, the ActivO approach leads to 5 times speedup relative to µGA in reaching a merit value of 104.0 and a much better optimum than is found by PSO. Similar to what was noted above, this is an averaged plot; for individual cases, the PSO does reach 104, but this is averaged out by other poorly performing trials.

Results obtained from ActivO, as shown in Table 3, indicate that the swirl ratio, start of injection, and injection pressures have the highest uncertainty in their optimum values as found using ActivO, while the temperature and pressure at IVC, nozzle inclusion angle, and EGR fraction have the lowest uncertainties.

TABLE 3

Optimum design parameters obtained from 25 trials using ActivO. Standard deviations are normalized by the range of the corresponding design parameter.

| Parameter | Mean Optimum | Standard Deviation |
|---|---|---|
| nNoz | 10 | $3.61 \times 10^{-2}$ |
| TNA | 1.03 | $6.40 \times 10^{-2}$ |
| $P_{inj}$ | 1450 | $9.06 \times 10^{-2}$ |
| SOI | −9.88 | $1.83 \times 10^{-1}$ |
| NozzleAngle | 78.12 | $2.51 \times 10^{-2}$ |
| EGR | 0.445 | $3.30 \times 10^{-2}$ |
| $T_{ivc}$ | 323 | $2.18 \times 10^{-3}$ |
| $P_{ivc}$ | 2.3 | $8.73 \times 10^{-3}$ |
| SR | −1.77 | $7.81 \times 10^{-2}$ |

Definitions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for design space optimization, comprising:
generating, by one or more processors, a plurality of first data points by evaluating a function;
training, by the one or more processors, a weak learner model using the plurality of first data points;
training, by the one or more processors, a strong learner model using the plurality of first data points, the strong learner model having a greater measure of fit to the plurality of first data points than the weak learner model;
defining, by one or more processors, a plurality of monitor points within a design space;
in a first iteration, generating, by the one or more processors using the weak learner model, a first count of second data points; generating, by the one or more processors, using the strong learner model, a second count of second data points using an optimizer; and generating, by the one or more processors, a first count of a plurality of output monitor points using the plurality of monitor points and the weak learner model;
in a second iteration, generating, by the one or more processors using the weak learner model, a third count of second data points; generating, by the one or more processors using the strong learner model, a fourth count of second data points using the optimizer; and
generating, by the one or more processors, a second
count of a plurality of output monitor points using the
plurality of monitor points and the weak learner model;
determining, by the one or more processors, a change of
the plurality of output monitor points above a predetermined threshold between the first iteration and the
second iteration;
in a third iteration, generating by the one or more processors using the weak learner model, a fifth count of
second data points, and generating, by the one or more
processors using the strong learner model, a sixth count
of second data points using the optimizer, wherein the
fifth count of second data points and the sixth count of
second data points are each determined based on the
change of the plurality of output monitor points above
the predetermined threshold;
evaluating, by the one or more processors using the
function, input values corresponding to the second data
points to generate a candidate optimum output; and
outputting, by the one or more processors, the candidate
optimum output responsive to an output condition
being satisfied.

2. The method of claim 1, wherein generating, by the one or more processors, the plurality of first data points includes applying randomly selected inputs to the function.

3. The method of claim 1, wherein training, by the one or more processors, the weak learner model includes providing the plurality of first data points as input to at least one of a regression model or a support vector machine.

4. The method of claim 1, wherein training, by the one or more processors, the strong learner model includes providing the plurality of first data points as input to at least one of a neural network or a random forest model.

5. The method of claim 1, further comprising:
generating, by the one or more processors, a plurality of candidate second data points; and
selecting, by the one or more processors, the second data points from the plurality of candidate second data points by determining that each second data point satisfies the optimization condition based on a candidate second data point meeting or exceeding a threshold percentile relative to the plurality of candidate second data points.

6. The method of claim 5, further comprising selecting, by the one or more processors, input values to generate the plurality of candidate second data points using a pseudo-random number generator and based on a distance between each input value.

7. The method of claim 1, further comprising determining, by the one or more processors, the output condition to be satisfied responsive to at least one of a threshold number of iterations or the candidate optimum output being within a threshold of an expected optimum of the function.

8. The method of claim 1, wherein an optimum of the function is a maximum value or a minimum value.

9. The method of claim 1, further comprising:
training, by the one or more processors, the strong learner model to include a plurality of neural networks, each neural network of the plurality of neural networks provided with at least one of different weights or different biases; and
generating, by the one or more processors, the sixth count of second data points using each of the plurality of neural networks.

10. The method of claim 1, further comprising updating, by the one or more processors responsive to the output condition not being satisfied, the weak learner model and the strong learner model using a plurality of second data points.

11. The method of claim 1, further comprising using the function to optimize a combustion process.

12. A system, comprising:
one or more processors configured to:
generate a plurality of first data points by evaluating a function;
train a weak learner model using the plurality of first data points;
train a strong learner model using the plurality of first data points, the strong learner model having a greater measure of fit to the plurality of first data points than the weak learner model;
define a plurality of monitor points within a design space;
in a first iteration, generate, using the weak learner model, a first count of second data points; generate, using the strong learner model, a second count of second data points; and generate a first count of a plurality of output monitor points using the plurality of monitor points and the weak learner model and;
in a second iteration, generate, using the weak learner model, a third count of second data points; generate, using the strong learner model, a fourth count of second data points; and generate a second count of a plurality of output monitor points using the plurality of monitor points and the weak learner model;
detect a change of the plurality of output monitor points above a predetermined threshold between the first iteration and the second iteration;
in a third iteration, generate using the weak learner model, a fifth count of second data points, and generate, using the strong learner model, a sixth count of second data points, wherein the fifth count of second data points and the sixth count of second data points are each determined based on the change of the plurality of output monitor points above the predetermined threshold;
evaluate, using the function, input values corresponding to the second data points to generate a candidate optimum output; and
output the candidate optimum output responsive to an output condition being satisfied.

13. The system of claim 12, wherein the one or more processors are configured to:
train the weak learner model by providing plurality of first data points as input to at least one of a regression model or a support vector machine; and
train the strong learner model by providing the plurality of first data points as input to at least one of a neural network or a random forest model.

14. The system of claim 12, wherein the one or more processors are configured to:
generate a plurality of candidate second data points using the weak learner model; and
determine that each second data point satisfies the optimization condition based on a candidate second data point meeting or exceeding a threshold percentile relative to the plurality of candidate second data points.

15. The system of claim 12, wherein the one or more processors are configured to determine the output condition to be satisfied responsive to at least one of a threshold number of iterations or the candidate optimum output being within a threshold of an expected optimum of the function.

16. The system of claim 12, wherein the one or more processors are configured to:

train the strong learner model to include a plurality of neural networks, each neural network of the plurality of neural networks provided with at least one of different weights or different biases; and generate the sixth count of second data points using each of the plurality of neural networks.

17. The system of claim 12, wherein the one or more processors are configured to generate, using the weak learner model, in a fourth iteration, a seventh count of second data points.

18. A method for optimizing a design space comprising:
(i) populating a design space with random N design points evaluated by a function evaluator and populating the design space with random X monitor points;
(ii) training a weak learner model using available data;
(iii) training a strong learner model using the available data, the strong learner model having a greater measure of fit to the available data than the weak learner model;
(iv) randomly sampling first points that the weak learner model predicts will be above a selected objective value ($\lambda$) based on an objective value function, the number of random sampling first points, where the first points are increased or decreased over iterations based at least on a change in output monitor points generated by the weak learner model using the random X monitor points output over iterations of the weak learner model;
(v) finding optimum points predicted by the strong learner model using a global optimization scheme, the optimum points increasing when the first points decrease and the optimum points decreasing when the first points increase;
(vi) adding the optimum points identified in step five to the first points to select N points to be evaluated by a design function;
(vii) performing design function evaluations on the N points to determine N design solutions; and
(viii) adding the N design solutions to a database and repeating steps 2-7 until the method converges or maximum number of iterations is reached.

19. The method of claim 1, wherein:
the fifth count of second data points is smaller than the third count of second data points responsive to the change of the plurality of output monitor points below the predetermined threshold;
the fifth count of second data points is larger than the third count of second data points responsive to the change of the plurality of output monitor points below the predetermined threshold; and
the sixth count of second data points is larger than the fourth count of second data points responsive to the fifth count of second data points being smaller than the third count of second data points and the sixth count of second data points is smaller than the fourth count of second data points responsive to the fifth count of second data points being larger than the third count of second data points.

20. The method of claim 5, wherein the plurality of candidate second data points is a first plurality of candidate second data points; and
further comprising generating, by the one or more processors, a second plurality of candidate second data points at a distance from the first plurality of candidate second data points defined by $$X_{new} = \mathrm{argmax}(d_{min}).$$

* * * * *